July 9, 1968  R. H. DAY  3,391,771
TIE-BACK ASSEMBLY FOR AIRCRAFT ESCAPE SLIDE
Filed Nov. 2, 1966  2 Sheets-Sheet 1
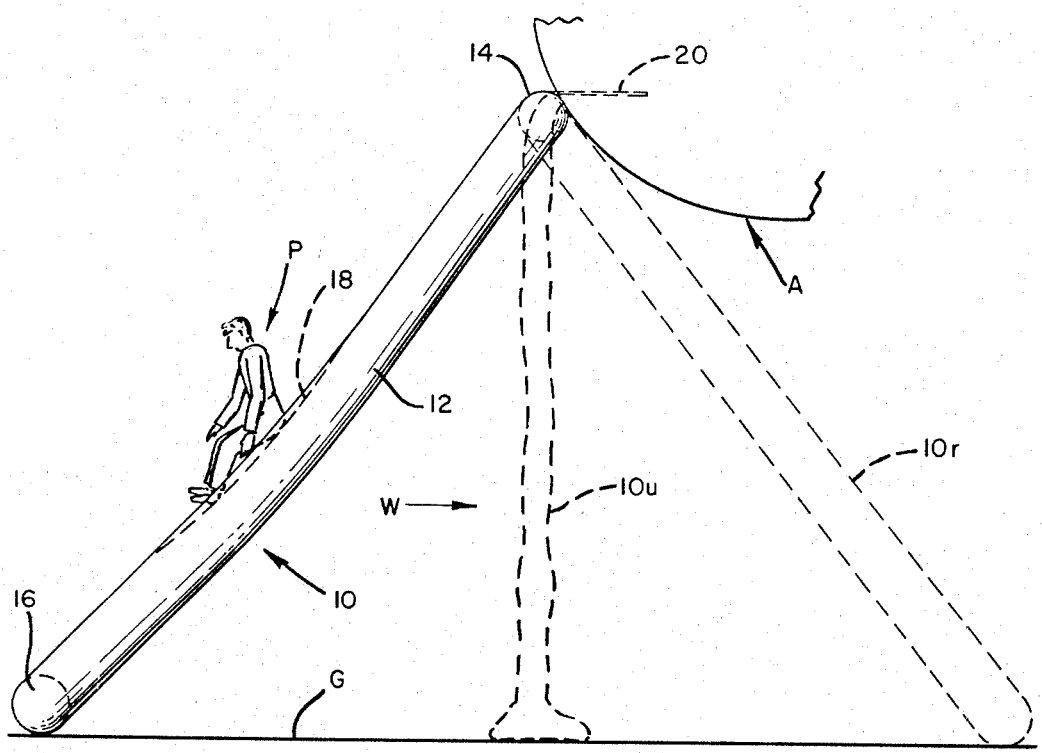
FIG-1
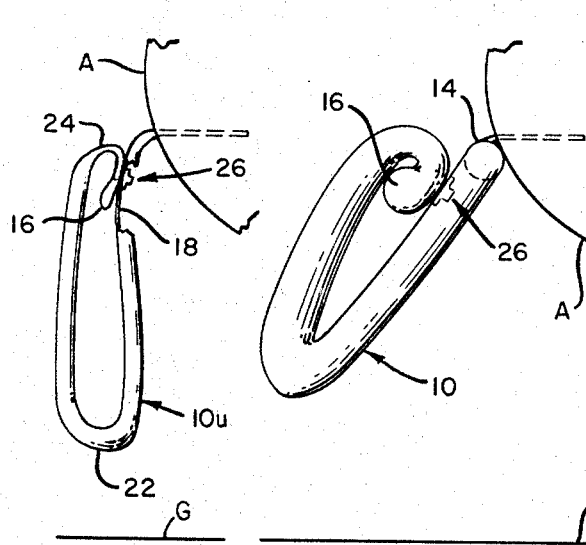
FIG-2-A
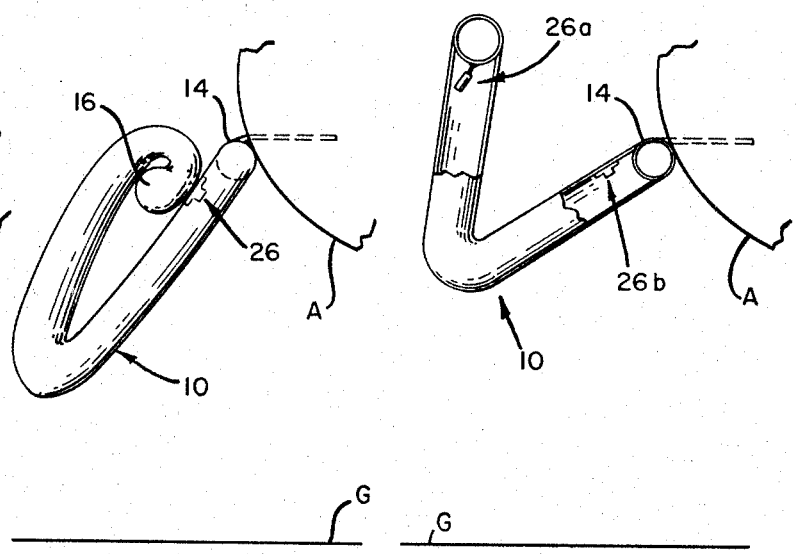
FIG-2-B
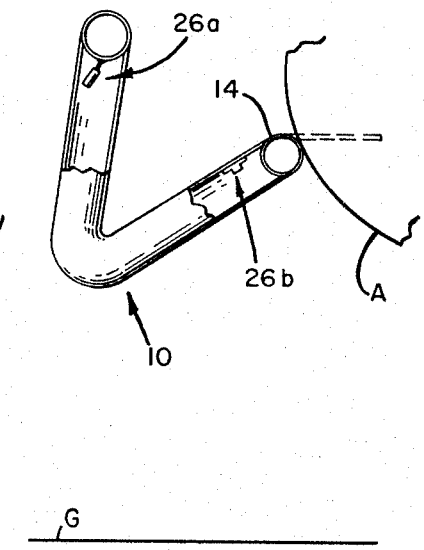
FIG-2-C
INVENTOR.
RONALD H. DAY
BY Gregg & Stidham
ATTORNEYS July 9, 1968 R. H. DAY 3,391,771
TIE-BACK ASSEMBLY FOR AIRCRAFT ESCAPE SLIDE
Filed Nov. 2, 1966 2 Sheets-Sheet 2

INVENTOR.
RONALD H. DAY
BY Gregg & Stidham
ATTORNEYS

United States Patent Office 3,391,771
Patented July 9, 1968

3,391,771
TIE-BACK ASSEMBLY FOR AIRCRAFT
ESCAPE SLIDE
Ronald H. Day, Mill Valley, Calif., assignor to Industrial Covers, Inc., San Francisco, Calif., a corporation of California
Filed Nov. 2, 1966, Ser. No. 591,545
8 Claims. (Cl. 193—25)

ABSTRACT OF THE DISCLOSURE

A releasable device for an inflatable aircraft escape chute to hold the chute in overlapped disposition, with the bottom folded up toward the top, until the chute is partially inflated. A male element secured near one end of the slide engages in a female element near the other end with split rings frictionally engaging the male element to hold the ends together. The split rings are contained within a housing to facilitate recovery after separation.

Description

This invention relates to a tie-back assembly for aircraft escape slides, and, more particularly, to a releasable, reuseable assembly for holding an inflatable escape slide against unfolding prematurely.

In the case of crash landings or emergencies away from the airport terminal building, it is highly desirable to evacuate the passengers as quickly as possible and, for this purpose, escape slides are provided to enable passengers to jump from an elevated fuselage without injury. Conventionally, such escape slides take the form of a flexible sheet member extended across distensible tubular members which, when inflated, function as load-carrying structural beams. Such structures are highly desirable for aircraft use in that they may be folded and packed into a compact mass with minimum space requirements for normal flight conditions, but may be released and immediately inflated for adequate evacuation capacity.

When emergency conditions require, such inflatable slides are normally released from their pack and, after being extended from an aircraft emergency exit, are inflated to provide an evacuation route. However, when projected from the plane's interior, and prior to inflation of their load-carrying beams into relatively rigid configuration, the slide is relatively limp and highly susceptible to wind deflection. In the case of a cross-wind blowing toward the aircraft evacuation exit, the limp, uninflated slide may be blown into a position carrying it beneath the aircraft, so that when inflated, the escape slide is completely useless.

It is, therefore, an object of this invention to provide a means for insuring inflation of an escape slide into proper position for passenger evacuation.

It is a further object of this invention to provide a device for retaining an escape slide partially folded until after inflation has commenced.

It is a further object of this invention to retain an inflatable aircraft escape slide in freely swinging position above the ground level until after inflation has commenced.

It is still a further object of this invention to provide a releasable device for holding an escape slide partially folded, which device is readily retrievable and reuseable.

In carrying out this invention, I provide complementary, releasable, interlocking members on the upper and lower portions of a collapsible, inflatable aircraft escape slide. The interlocking members comprise male and female members, each mounted near one end of the slide to hold the slide in overlapped relationship, folded along a transverse line with the bottom of the slide secured near the top. Releasable gripping members hold the interlocking members engaged until they are overcome by the pressure of fluid within the inflatable members acting to separate them. A transverse top inflatable cross-beam is carried so as to bear against the side of the aircraft to hold the slide against transverse deflection in a direction parallel to the aircraft, and to urge the slide during inflation into a disposition diverging from a vertical plane parallel to the aircraft. Thus, when the top cross-beam inflates, it is held firmly against the surface of the fuselage so that it is held in a position tangential to the engaging surfaces and, during inflation, the escape slide is moved from a limp, hanging position to swing upward from the vertical. Then, as inflation continues, the releasable interlocking members are overcome and the slide unfolds to its full length resting on the ground to present a sloping escape route for passengers.

Other objects and advantages of this invention will become apparent from the description following, when taken in conjunction with the accompanying drawings, wherein:

FIGURE 1 is a side elevation view of an escape slide in use, and illustrating in phantom problems encountered in conventional devices;

FIGURES 2A, 2B and 2C illustrate methods of inflating an escape slide in accordance with the present invention;

Figure 3:
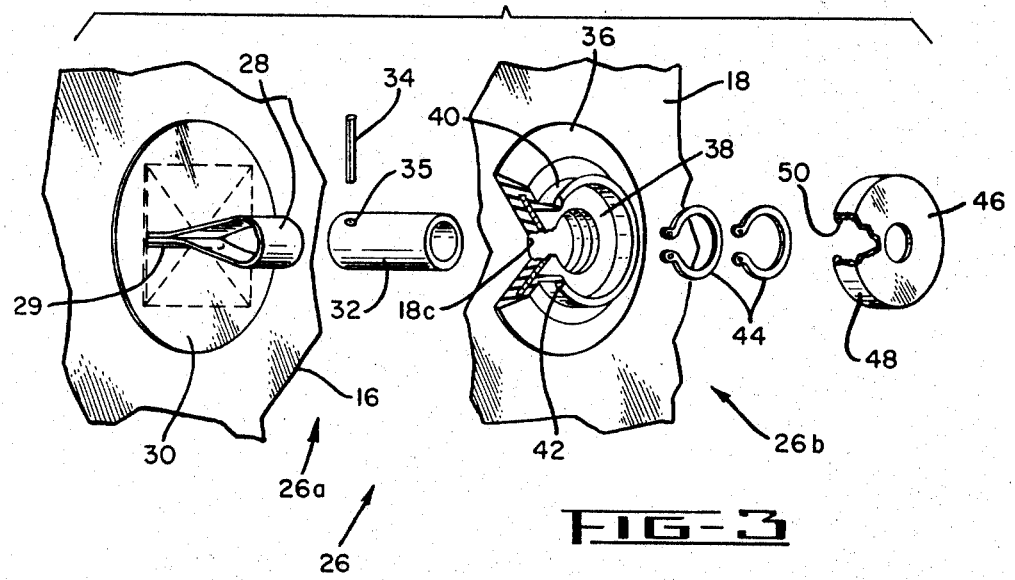
FIGURE 3 is an exploded view of the releasable mechanism illustrating the components thereof.

Referring now to the drawings with greater particularity, there is shown in FIGURE 1 an escape slide 10 including two or more longitudinal inflatable beams 12 and top and bottom inflatable bearing members 14 and 16 which, together, carry a flexible sheet 18 which functions as the slide surface for evacuation of a passenger P from an aircraft A to the ground level G. The slide is firmly anchored at its upper end to the aircraft A by any suitable means, such as a strap 20 of substantial tensile strength, and the upper, cross-bearing member bears against the side of the aircraft when inflated to support the slide against lateral deflection by wind forces, or the like. In addition, the upper bearing member, when inflated, tends to dispose the escape slide at a tangent to the side of the aircraft fuselage A, whereby the desired slope of the slide is achieved naturally. However, as shown in phantom in FIGURE 1, the limp, uninflated escape slide merely hangs limply and offers no resistance to the forces of wind.

If, while the uninflated escape slide $10_u$ is hanging limply, a cross-wind blows against it toward the aircraft A in the direction of the arrow W in FIGURE 1, the slide may be blown to a disposition carrying beneath the aircraft whereby engagement of the subsequently inflated slide beams with the ground G prevents it from achieving the desired disposition shown at the left, and the slide $10_r$ is inclined in reverse position rendering it totally useless for evacuation. A device for preventing such improper disposition is a principal feature of this invention.

Referring now to FIGURES 2A, 2B and 2C, the uninflated slide, when packed, is folded at 22 and the lower portion is folded upward to overlie the upper portion with the bottom cross-beam 16 folded under at 24 and releasably secured to the upper portion of the slide surface 18 by a releasable hold-back means 26, hereinafter to be described in detail. Then, as inflation of the slide commences, the longitudinal support beams become inflated and inflation of the top bearing member 14 causes it to bear against the fuselage A so that it tends to be disposed in tangential relationship thereto and the escape slide swings upwardly to an angle of inclination from the vertical, as shown in FIGURE 2B. Then, as inflation continues, the force of the fluid within the inflated beam separates the male element 26a of the releasable hold-down means from the female element 26b whereby the lower portion of the slide 10 swings away from the upper portion into fully extended, evacuation disposition, as shown in full lines in FIGURE 1. Thus, the escape slide 10 is kept free from the ground G until inflation commences and the upper bearing cross-member 14 pressure causes the slide to swing free from vertical whereby full extension of the slide precludes it from swinging beyond that angle which would bring it into contact with the surface of the ground G.

Referring now to FIGURE 3, there is shown an exploded view of the components making up the releasable hold-down assembly 26. The male component 26a includes a strap 28 which is extended through a slit 29 and sewn to the underside of a patch member 30 which, in turn, is secured, as by bonding to the lower portion of the slide, and preferably to the lower bearing tube 16, for reasons hereinafter to become apparent. The loop of the strap 28 is extended into a hollow cylindrical shaft or male member 32 and held therein by engagement by a split spring pin 34 which is compressed by any suitable means (not shown); inserted through aligned holes 35 in the shaft 32 and through the strap loop 28; and is thereafter sprung so as to be retained securely in a pressed fit. Secured to the underside of the slide surface at the upper portion thereof is a female member 26b comprising a disc-like base 36 of rubber or the like, which is preferably reinforced by a metallic washer 38 to provide some degree of rigidity. Extending axially from the disc-like base is a cylindrical housing portion 40 having enlarged lip portions 42, the purpose of which is hereinafter to be described. A pair of split friction gripping rings 44, such as those marketed under the trademark "Gripring," are adapted to be secured over the hollow cylinder 32 when it is extended through the openings 18c in the slide surface and the base 36 to hold it against retraction. When the split rings 44 are in place, a cover or closure member 46 having depending sides 48 and enlarged complementary lips 50 is snapped over the cylindrical housing 40 to enclose the split rings 44 and cylinder end 32.

Figure 4:
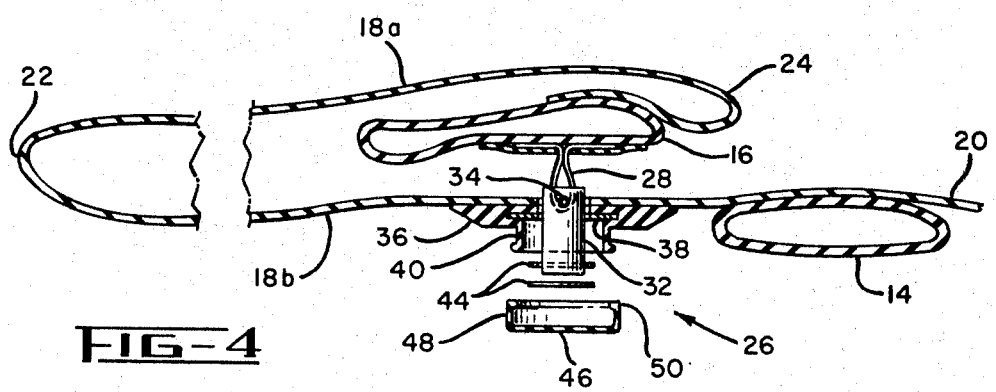
FIGURE 4 is a view in section through an escape slide illustrating assembly of my releasable hold-down mechanism.
Figure 5:
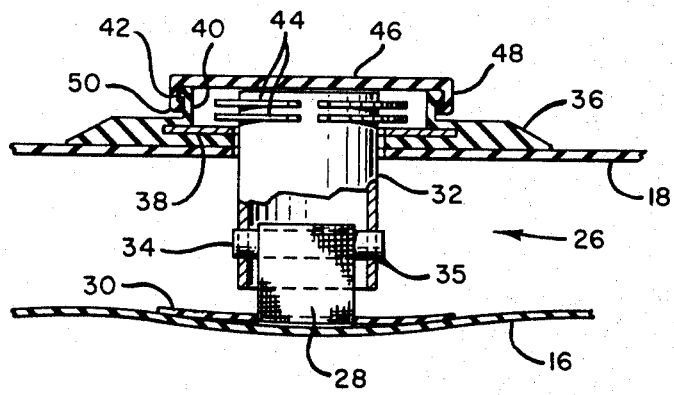
FIGURE 5 is a section view taken through the releasable mechanism and showing the arrangement of components as assembled.

As illustrated in FIGURES 4 and 5, the releasable hold-down device is assembled during the course of packing the inflatable escape slide in a manner now to be described. The lower portion 18a of the slide is folded transversely at 22 so as to overlie the upper portion 18b and the bottom uninflated cross-beam 16 is folded under the slide surface 18a whereby the cylinder or male element 32 is extended toward the slide surface at the upper portion 18b. Then, the element is inserted through the opening in the upper portion slide surface and through the mounting disc 36 sufficiently far to extend beyond the opening in the housing 40. At this point, the split ring holding elements 44 are spread by any suitable means (not shown) and mounted over the cylinder 32, so that when released they grip it firmly under frictional engagement. Then, after a sufficient number of split holding rings 44 are applied to provide the necessary gripping power, the cap 46 is forced down to snap the lips 50 over those 42 on the housing to enclose and house the upper portion of the cylinder and split holding rings 44, as shown in FIGURE 5. Thus, it will be apparent that when the male element 26a is separated from the female element 26b and pulled through the opening in the base under force of the expanding bottom cross-bearing member 16 to which it is directly applied, the split rings 44, though released, will be retained within the housing 40 and by removal of the cap 46 they may be readily retrieved for further use.

It is highly desirable that the holding elements remain in place until after inflation has progressed sufficiently to swing the slide to the position shown in FIGURE 2B and, for this purpose, there are a number of means by which the total friction holding force can be adjusted. For example, the diameter of the shaft may be increased to provide a predetermined total gripping area between the rings and the shaft; the number of gripping means may be varied according to the desired total holding force; and the finish and hardness of the shaft may be varied in order to control the coefficient of friction. In any event, the device is designed to hold the slide in its folded disposition to a predetermined point in the inflation at which time the components are separated and each is retained intact on the underside of the slide surface 18 so as not to impede evacuation but to be available for instant reuse.

While this invention has been described in connection with a preferred embodiment thereof, it is obvious that modifications and changes therein may be made by those skilled in the art without departing from the spirit and scope of this invention as defined by the claims appended hereto.

Having described my invention, I claim:

1. In combination with an escape slide having means at the upper end thereof adapted for attachment to an aircraft fuselage adjacent the lower portion of an evacuation opening therein, inflatable tubes including at least one pair of longitudinal support beams, and a flaxible sheet supported across said support beams, releasable securing means for holding the lower end of said slide folded upwardly along a transverse fold to overlie the upper portion of said slide, said securing means comprising:
   a male element,
   means securing said male element to one of said upper and lower portions of the slide,
   means forming a complementary female element in the other of said portions receiving said male element therethrough, and
   at least one split ring frictionally engaged on and gripping said male element on the opposite side of said other portion to hold said portions together,
   the total frictional force holding said split ring on said male element being set so as to be overcome by force of gas pressure within an inflatable tube during inflation thereof.

2. The combination defined by claim 1 including:
   means for confining movement of said split ring after said male element is withdrawn therefrom.

3. The combinaion defined by claim 2 wherein said confining means comprises:
   a housing including a wall having an opening therein, snugly receiving said male element,
   said housing being secured on said opposite side of the other portion,
   said male element with spit ring thereon being normally received within said housing, and
   a closure cap on said housing removable to enable placement of said split ring.

4. The combination defined by claim 1 wherein:
   the area of frictional contact between said split ring and said male member is predetermined so as to achieve said total frictional gripping force.

5. The combination defined by claim 1 wherein:
   the finish and hardness of said male member are adapted to influence said total frictional gripping force.

6. The combination defined by claim 1 including:
   additional split rings gripping said male member, the number of split rings being dictated by said total frictional force.

7. The combination defined by claim 1 wherein:

said escape slide includes a bottom transverse inflatable tube as a ground bearing member,
said bottom transverse tube being folded under so as to be disposed between the upper and lower portions of said slide,
one of said male and female elements being secured to said bottom transverse tube so that force resulting from expansion thereof is transmitted directly to separate said elements.

8. The combination defined by claim 1 wherein:
said escape slide includes a top transverse inflatable tube as a fuselage bearing member, and including:
means securing said top transverse tube to said fuselage so that fluid pressure therein is transmitted to said fuselage along a line of tangency through which the desired angle of slide inclination passes.

References Cited

UNITED STATES PATENTS

| | | | |
|---|---|---|---|
| 2,752,977 | 7/1956 | Clarke et al. | 9—11 |
| 2,765,131 | 10/1956 | Boyle | 193—25 |
| 3,018,867 | 1/1962 | Heyniger | 193—25 |
| 3,102,623 | 9/1963 | Schacht et al. | 193—25 |

ANDRES H. NIELSEN, *Primary Examiner.*